United States Patent [19]

Hurter

[11] 4,219,472
[45] Aug. 26, 1980

[54] 5-AMINOMETHYL-2-AMINO NAPHTHYL-(1) AZO DYES

[75] Inventor: Rudolf Hurter, Basel, Switzerland

[73] Assignee: Ciba-Geigy Corporation, Ardsley, N.Y.

[21] Appl. No.: 908,498

[22] Filed: May 22, 1978

[30] Foreign Application Priority Data

May 27, 1977 [LU] Luxembourg .................. 77430

[51] Int. Cl.² ............ C09B 62/08; C09B 62/24; C09B 62/40; C09B 62/50
[52] U.S. Cl. .................. 260/145 B; 260/146 R; 260/146 D; 260/146 T; 260/147; 260/153; 260/154; 260/155; 260/156; 260/158; 260/162; 260/163; 260/173; 260/194; 260/196; 260/202; 260/510; 260/570.9
[58] Field of Search .......... 260/145 A, 145 B, 145 C, 260/146 R, 146 D, 146 T, 147, 153, 154, 155, 156, 157, 158, 173, 194, 196, 162, 163

[56] References Cited

U.S. PATENT DOCUMENTS

| | | | |
|---|---|---|---|
| 3,213,078 | 10/1965 | Benz et al. | 260/146 D |
| 3,218,310 | 11/1965 | Benz et al. | 260/154 |
| 3,336,284 | 8/1967 | Jager et al. | 260/154 |
| 3,518,246 | 6/1970 | Auerbach et al. | 260/154 |

FOREIGN PATENT DOCUMENTS 2232541 1/1974 Fed. Rep. of Germany .......... 260/154

Primary Examiner—Floyd D. Higel
Attorney, Agent, or Firm—Edward McC. Roberts

[57] ABSTRACT

The invention relates to novel azo dyes of the formula

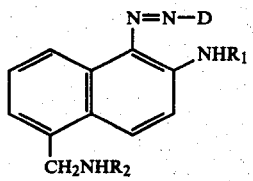

wherein $R_1$ represents hydrogen, alkyl of 1 to 8 carbon atoms or the phenyl radical, $R_2$ represents hydrogen, an acyl radical or a fibre-reactive radical, and D represents the radical of any diazo component, which dyes are useful for dyeing and printing a wide variety of natural and synthetic textile materials and leather; thus the acid dyes, which optionally contain fiber-reactive groups, are used for dyeing and printing materials such as cellulose and natural or synthetic polyamide. The cationic dyes are especially used in dyeing and printing polyacrylonitrile, and the disperse dyes are especially used in dyeing and printing polyester materials.

7 Claims, No Drawings

5-AMINOMETHYL-2-AMINO NAPHTHYL-(1) AZO DYES

The invention relates to novel azo dyes of the formula I

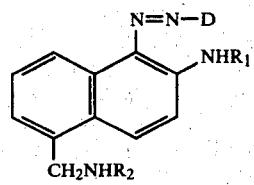

wherein
- $R_1$ represents hydrogen, alkyl of 1 to 8 carbon atoms or a phenyl radical,
- $R_2$ represents hydrogen, an acyl radical or a fibre-reactive radical Z and
- D represents the radical of any diazo component, and to the production and also the use of the azo dyes of the formula I for dyeing or printing natural or synthetic textile material or leather, as well as to the natural or synthetic textile material or leather dyed or printed with these dyes.

$R_1$ is an alkyl radical of 1 to 8 carbon atoms can be both straight chain and branched and is for example the methyl, ethyl, n-propyl, isopropyl, n-butyl, sec-butyl and tert-butyl radical, a linear or branched pentyl, hexyl, heptyl or octyl radical. These alkyl radicals can also be substituted, for example by phenyl. Such radicals are for example aralkyl radicals, such as the benzyl radical.

$R_1$ as a phenyl radical is preferably unsubstituted or substituted by the customary substituents of azo dyes. These substituents are for example sulphonamide groups which are unsubstituted or mono- or disubstituted at the nitrogen atom, alkylamino groups, arylamino groups, alkyl groups which are unsubstituted or substituted by phenyl or halogen, for example the trifluoromethyl group; the nitro, cyano and hydroxyl group, alkoxy groups, such as the methoxy and ethoxy group, azo groups and halogen atoms, such as fluorine, chlorine or bromine atoms.

In preferred azo dyes of the formula I, $R_1$ represents hydrogen.

$R_2$ as an acyl radical represents for example the radical of the formula —COR or —SO$_2$R, wherein R represents an alkyl radical, such as the methyl, ethyl, n-propyl or isopropyl radical or the butyl radical, an aralkyl radical for example the benzyl radical, or an aryl radical, for example the phenyl radical, which can be further substituted in addition by an alkyl radical or by other customary substituents of azo dyes, such as alkoxy or halogen.

A fibre-reactive radical Z represented by $R_2$ is to be understood as meaning a radical which contains one or more reactive groups or removable substituents in the molecule which are able to react for example with the hydroxyl groups of cellulosic materials in the presence of acid acceptors and optionally with the active of heat, or with the NH groups of natural polyamide fibres, such as wool, to form covalent bonds. A great number of such fibre-reactive groups are known from the literature.

Suitable fibre-reactive groups Z which contain at least one removable substituent bonded to a heterocyclic or an aliphatic radical are, among others, those which contain at least one reactive substituent bonded to a 5- or 6-membered heterocyclic ring, such as a monoazine, diazine, triazine, for example pyridine, pyrimidine, pyridazine, pyrazine, thiazine, oxazine or asymmetrical or symmetrical triazine ring, or to such a ring system which contains one or more fused aromatic rings, such as a quinoline, phthalazine, quinazoline, quinoxaline, acridine, phenazine and phenanthridine ring system; the 5- or 6-membered heterocyclic rings which contain at least one reactive substituent are, accordingly, those which can contain one or more nitrogen atoms and fused 5-membered, or preferably 6-membered, carbocyclic rings. Among the reactive substituents at the heterocyclic ring system there may be mentioned for example halogen atoms, such as chlorine, bromine or fluorine atoms, ammonium, including hydrazinium, sulphonium, sulphonyl, azido-(N$_3$), thiocyanato, thio, thioether, oxyether, sulphinic acid and sulphonic acid. Specific examples are: mono- or dihalogeno-symmetrical triazinyl radicals, for example 2,4-dichlorotriazinyl-6, 2-amino-4-chlorotriazinyl-6, 2-alkylamino-4-chloro-triazinyl-6, such as 2-methylamino-4-chlorotriazinyl-6, 2-ethylamino- or 2-propylamino-4-chlorotriazinyl-6, 2-β-oxoethylamino-4-chlorotriazinyl-6, 2-di-β-oxoethylamino-4-chlorotriazinyl-6 and the corresponding sulphuric acid hemiesters, 2-diethylamino-4-chlorotriazinyl-6, 2-morpholino- or 2-piperidino-4-chloro-triazinyl-6, 2-cyclohexylamino-4-chlorotriazinyl-6, 2-arylamino- and substituted arylamino-4-chlorotriazinyl-6, such as 2-phenylamino-4-chlorotriazinyl-6-, 2-(o-, m- or p-carboxy- or sulphophenyl)amino-4-chlorotriazinyl-6, 2-alkoxy-4-chloro-triazinyl-6, such as 2-methoxy- or -ethoxy-4-chlorotriazinyl-6, 2-(phenylsulphonylmethoxy)-4-chlorotriazinyl-6, 2-aryloxy- and substituted aryloxy-4-chlorotriazinyl-6, such as 2-phenoxy-4-chlorotirazinyl-6, 2-(p-sulphophenyl)-oxy-4-chlorotriazinyl-6, 2-(o-, m- or p-methyl- or -methoxyphenyl)-oxy-4-chlorotriazinyl-6, 2-alkylmercapto- or 2-arylmercapto- or 2-(substituted aryl)-mercapto-4-chlorotriazinyl-6, such as 2-β-hydroxyethyl-mercapto-4-chlorotriazinyl-6, 2-phenyl-mercapto-4-chlorotriazinyl-6, 2-(4'-methylphenyl)-mercapto-4-chlorotirazinyl-6, 2-(2',4'-dinitro)-phenylmercapto-4-chlorotriazinyl-6, 2-methyl-4-chlorotriazinyl-6 and the 2-phenyl-4-chlorotriazinyl-6 radical.

Particularly interesting radicals Z are fluoro-1,3,5-triazine radicals of the formula

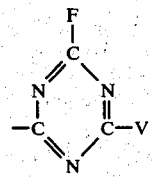

wherein substituent V at the triazine ring are in particular: radicals of primary, secondary and tertiary amines, such as —NH$_2$, —NHCH$_3$, —NHC$_2$H$_5$, —N(CH$_3$)$_2$, —N(C$_2$H$_5$)$_2$, —NHC$_2$H$_4$OH, —N(C$_2$H$_4$OH)$_2$, morpholino, piperidino, N-phenylamino, N-(2-, 3- or 4-sulphophenyl)-amino, N-toluidino and N-(2,4- or 2,5-disulphophenyl)-amino.

Interesting reactive radicals Z are also those of the formula

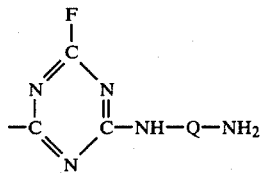

wherein Q represents an aliphatic or aromatic bridge member. Such radicals Z can be further substituted by 2,4,6-trifluoro-1,3,5-triazine to give a radical Z of the formula

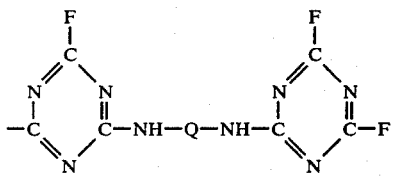

which can finally be reacted with an amine. Suitable amines are for example ammonia, methylamine, ethylamine, dimethylamine, diethylamine, ethanolamine, diethanolamine, morpholine, piperidine, 2-, 3- or 4-aminotoluene, metanilic acid, sulphanilic acid, aniline N-methylaniline, 4-aminobenzylsulphonic acid, 2-, 3- or 4-aminobenzoic acid, naphthylaminomono-, -di- and -trisulphonic acids as well as dyes which contain amino groups, for example of the monoazo or polyazo, phthalocyanine, formazane, anthraquinone, stilbene, oxazine, dioxazine, triphenylmethane, nitro or azomethine series.

Suitable diamines which introduce the radical of the formula —NH—Q—NH$_2$ are for example: ethylenediamine, 1,3-diaminopropane, 1,6-diaminohexane, 1,3- and 1,4-phenylenediamine, 1,3-phenylenediamine-4-sulphonic acid, 1,4-phenylenediamine-2-sulphonic acid, 2,4-diaminotoluene, 4,4'-diaminodiphenyl-2,2'-disulphonic acid, 4,4'-diamino-diphenyl urea-2,2'-disulphonic acid, 2,6-diaminonaphthalene-4,8-disulphonic acid, 4,4'-diamino-diphenyl ether and 2,5-diaminobenzoic acid.

Also of interest are mono-, di- or trihalogenopyrimidinyl radicals, such as 2,4-dichloropyrimidinyl-6, 2,4,5-trichloropyrimidinyl-6, 2,4-dichloro-5-nitro- or -5-methyl- or -5-carboxymethyl- or -5-carboxy- or -5-cyano- or -5-vinyl- or -5-sulpho- or -5-mono-, -di- or trichloromethyl- or -5-carboalkoxy-pyrimidinyl-6, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3- monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinazoline-7- or -6-sulphonyl or -carbonyl, 2- or 3- or 4-(4',5'-dichloropyridazon-6'-yl-1')-phenyl-sulphonyl- or -carbonyl, β-(4',5'-dichloropyridazon-6'-yl-1')-ethylcarbonyl, N-methyl-N'-(2,4-dichlorotriazinyl-6-)-carbamyl, N-methyl-N-(2-methylamino-4-chlorotriazinyl-6)-carbamyl, N-methyl-N-(2-dimethylamino-4-chlorotriazinyl-6)-carbamyl, N-methyl- or N-ethyl-N-(2,4-dichlorotriazinyl-6)-aminoacetyl, N-methyl-N-(2,3-dichloroquinoxaline-6-sulphonyl)-aminoacetyl, N-methyl-N-(2,3-dichloroquinoxaline-6-carbonyl)-aminoacetyl, as well as the corresponding bromine and fluorine derivatives of the above chlorine-substituted heterocyclic radicals, among which are for example 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl; triazinyl radicals which contain sulphonyl groups, such as 2,4-bis-(phenylsulphonyl)-triazinyl-6, 2(3'-carboxyphenyl)-sulphonyl-4-chlorotriazinyl-6, 2-(3'-sulphophenyl)-sulphonyl-4-chlorotriazinyl-6-, 2,4-bis-(3'-carboxyphenylsulphonyl)-triazinyl-6; pyrimidine ring which contain sulphonyl groups, such as 2-carboxymethylsulphonyl-pyrimidinyl-4, 2-methylsulphonyl-6-methylpyrimidinyl-4, 2-methylsulphonyl-6-ethyl-pyrimidinyl-4, 2-phenylsulphonyl-5-chloro-6-methyl-pyrimidinyl-4, 2,6-bis-methylsulphonyl-pyrimidine-4, 2,6-bis-methylsulphonyl-5-chloro-pyrimidinyl-4, 2,4-bis-methylsulphonyl-pyrimidine-5-sulphonyl, 2-methylsulphonyl-pyrimidinyl-4, 2-phenyl-sulphonylpyrimidinyl-4, 2-trichloromethylsulphonyl-6-methyl-pyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chloro-6-ethyl-pyrimidinyl-4, 2-methylsulphonyl-5-chloro-6-chloromethyl-pyrimidinyl-4, 2-methylsulphonyl-4-chloro-6-methylpyrimidine-5-sulphonyl, 2-methylsulphonyl-5-nitro-6-methyl-pyrimidinyl-4, 2,5,6-tris-methylsulphonylpyrimidinyl-4, 2-methylsulphonyl-5,6-dimethyl-pyrimidinyl-4, 2-ethylsulphonyl-5-chloro-6-methyl-pyrimidinyl-4, 2-methylsulphonyl-6-chloro-pyrimidinyl-4, 2,6-bis-methylsulphonyl-5-chloro-pyrimidinyl-4, 2-methylsulphonyl-6-carboxypyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxypyrimidinyl-4, 2-methylsulphonyl-5-chloropyrimidinyl-4, 2-sulphoethylsulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloropyrimidine- 4- and -5-carbonyl, 2,6-bis-(methylsulphonyl)-pyrimidine-4- or -5-carbonyl, 2-ethylsulphonyl-6-chloropyrimidine-5-carbonyl, 2,4-bis-(methylsulphonyl)-pyrimidine-5-sulphonyl-, 2-methylsulphonyl-4-chlor-6-methylpyrimidine-5-sulphonyl or -carbonyl; triazine groups which contain ammonium groups, such as 2-trimethylammonium-4-phenylamino- or -4-(o-, m- or p-sulphophenyl)-aminotriazinyl-6, 2-(1,1-dimethylhydrazinium)-4-phenylamino- or -4-(o-, m- or p-sulphophenyl)-amino-triazinyl-6, 2-(2-isopropylidene-1,1-dimethyl)-hydrazinium-4-phenylamino- or -4-(o-, m- or p-sulphophenyl)-aminotriazinyl-6, 2-N-aminopyrrolidinium- or 2-N-aminopiperidinium-4-phenylamino- or -4-(o-, m- or p-sulphophenyl)-aminotriazinyl-6, and 4-phenylamino- or 4-(sulphophenylamino)-triazinyl-6 radicals, to which the 1,4-bis-azabicyclo-[2,2,2]octane or 1,2-bis-aza-bicyclo[0.3.3]-octane is attached in the 2-position through a quaternary nitrogen bond, 2-pyridinium-4-phenylamino- or -4-(o-, m- or p-sulphophenyl)-amino-triazinyl-6 radicals as well as corresponding 2-oniumtriazinyl-6 radicals which are substituted in the 4-position by alkylamino, such as methylamino, ethylamino or β-hydroxyethylamino groups, or by alkoxy groups, such as methoxy or ethoxy groups, or by aryloxy groups, such as phenoxy or sulphophenoxy groups; 2-chlorobenzthiazole-5- or -6-carbonyl or 2-chlorobenzthiazole-5- or -6-sulphonyl, 2-arylsulphonyl- or 2-alkylsulphonylbenzthiazole-5- or -6-carbonyl or -5- or -6-sulphonyl derivatives, such as 2-methylsulphonyl- or 2-ethylsulphonylbenzthiazole-5- or -6-sulphonyl- or -carbonyl, 2-phenylsulphonyl-benzthiazole-5- or -6-sulphonyl or -carbonyl derivatives and the corresponding 2-sulphonylbenzthiazole-5- or -6-carbonyl or -sulphonyl derivatives which contain sulpho groups in the fused benzene ring, 2-chlorobenzoxazole-5- or -6-carbonyl- or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl, N-oxide of 4-chloro- or 4-nitroquinoline-5-carbonyl.

Reactive groups of the aliphatic series may also be mentioned, for example mono-, di or trichloroacryloyl radicals or mono- or dibromoacryloyl radicals, for example dibromopropionyl, —CO—CH=CH—Cl, —COCCl=CH$_2$, —CO—CCl=CH—CH$_3$, and —CO—CCl=CH—COOH, —CO—CH=C-Cl—COOH, β-chloropropionyl, 3-phenylsulphonylpropionyl, 3-methylsulphonylpropionyl, β-sulphatoethylaminosulphonyl, vinylsulphonyl, β-chloroethylsulphonyl, β-sulphatoethylsulphonyl, β-methylsulphonylethylsulphonyl, β-phenylsulphonylethylsulphonyl, 2-fluoro-2-chloro-3,3-difluorocyclobutane-1-carbonyl, 2,2,3,3-tetrafluorocyclobutane-carbonyl-1 or -sulphonyl-1, β-(2,2,3,3-tetrafluorocyclobutyl-1)-acryloyl, α- or β-bromoacryloyl, α- or β-alkyl- or -arylsulphonyl-acryloyl group, such as α- or β-methylsulphonyl-acryloyl.

In preferred azo dyes of the formula I, R$_2$ represents hydrogen.

The novel azo dyes of the formula I are obtained by coupling a diazo compound of an amine of the formula II

D—NH$_2$     (II)

wherein D represents the radical of any diazo component, with a coupling component of the formula III

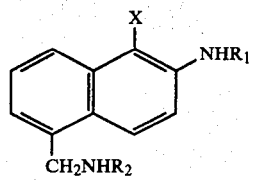

(III)

wherein R$_1$ and R$_2$ have the above meanings and X represents hydrogen or the SO$_3$H group, preferably in a mineral acid, acetic acid or also in a neutral medium.

If the coupling product still contains acylatable amino groups, it can be subsequently reacted with a reactive compound X—Z which introduces an acyl radical or the fibre-reactive radical Z, and wherein X represents a removable substituent, to give reactive dyes. Reactive components suitable for the purpose are for example those which are based on the above mentioned reactive groups, in general halides, especially chlorides, of the cited components, whilst the condensation is usually carried out in aqueous or organic medium and in an alkaline to acid range.

If the coupling product still contains in the radical D metallisable groups in the ortho-position to the azo bridge, these groups can be subsequently converted with metal donors, or with previously formed 1:1 metal complexes, into 1:1, or symmetrical or unsymmetrical 1:2, metal complex dyes, for example into the copper, chromium, nickel or cobalt complexes, with inclusion of the amino group in the 2-position of the naphthalene nucleus of the coupling component.

If the azo dyes of the formula I still contain diazotisable amino groups, these can also be diazotised by a conventional process and again reacted with the same coupling component of the formula III or with another suitable coupling component to give disazo dyes. If, on the other hand, the azo dyes of the formula I still contain couplable groups, for example an acetoacetyl radical, then these dyes can in turn be condensed with diazo components of the formula II to give disazo dyes.

The diazo components of the formula II are known and can be prepared by methods which are in themselves known.

Suitable diazo components of the formula II are for example those of the aromatic or also heterocyclic series.

Aromatic diazo components are in particular those of the series of the aminobenzenes, aminonaphthalenes, aminohydroxynaphthalenes and acetoacetamides.

Heterocyclic diazo components are in particular 5- or 6-membered heterocyclic diazo components which contain, as heteroatom, for example nitrogen, oxygen or sulphur. Examples are aminopyrazoles, aminobenzpyrazoles, aminothiazoles and aminobenzthiazoles.

The radical D of the diazo component of the formula II can advantageously be further substituted, for example by the customary substituents of azo dyes. In addition, this radical D can preferably contain the following groups: water-solubilising groups, for example the sulphonic acid group, carboxyl group or the phosphonic acid group; fibre-reactive groups of the kind represented by Z; cationic groups and metallisable groups, for example the —OH, —COOH and the —NH group.

From the large number of possible diazo components, selective mention may be made of the following:
1-amino-2-methoxy-4-nitrobenzene-5-sulphonic acid,
1,4-diaminobenzene-2,5-disulphonic acid, 1,3-diaminobenzene-4,6-disulphonic acid,
1-amino-5-[1,2-dibromopropionylamino]-benzene-2,4-disulphonic acid,
1-amino-5-[1-bromoacryloylamino]-benzene-2,4-disulphonic acid,
1-amino-5-[1-bromoacryloylamino]-benzene-2-sulphonic acid,
1-amino-4-[1-bromoacryloylamino]-benzene-2-sulphonic acid,
1-amino-4-[1,2-dibromopropionylamino]-benzene-2-sulphonic acid,
chlorides of 1-amino-4-trimethylammoniumacetyl-benzene,
1-amino-4-[3-trimethylammoniumpropylamino-sulphonyl]-benzene,
1-amino-2-carboxy-4-nitrobenzene,
1-amino-2-hydroxy-5-nitrobenzene-3-sulphonic acid,
1-amino-2-hydroxy-4-nitrobenzene,
1-amino-2-hydroxy-3-nitro-5-chlorobenzene,
1-amino-2-carboxybenzene-4-sulphonic acid,
1-amino-2-hydroxy-6-nitro-naphthalene-4-sulphonic acid,
1-amino-4-[3-dimethylaminopropylaminosulphonyl]-benzene,
1-amino-2-methoxy-4-nitrobenzene,
1-amino-2-chlorobenzene,
1-amino-2-methoxybenzene and
1-amino-4-chlorobenzene.

Some of the coupling components of the formula III are new and can be obtained by the Tscherniak-Einhorn-reaction, for example by reaction of 2-aminonaphthalene-1-sulphonic acid with N-methylolamides analogously to the particulars of German Offenlegungsschrift No. 2,264,698.

Suitable coupling components of the formula III are for example: 2-amino-5-aminomethylnaphthalene-1-sulphonic acid, 2-amino-5-bromoacryloylaminomethylnaphthalene-1-sulphonic acid, 2-amino-5-dibromo-propionylaminomethylnaphthalene-1-sulphonic acid and 2-amino-5-acetylaminomethylnaphthalene-1-sulphonic acid. The preferred coupling component, however, is 2-amino-5-aminomethylnaphthalene-1-sulphonic acid, and the aminomethyl group in the 5-position is preferably acylated with a fibre-reactive compound after the coupling.

If coupling components of the formula III, wherein X represents hydrogen, are used as starting materials in the production of the novel azo dyes of the formula I, these compounds are obtained by desulphonation of compounds of the formula III, wherein X represents the $SO_3H$ group.

Preferred azo dyes of the formula I are those wherein D represents the radical of any diazo component which contains at least one water-solubilising group and optionally a fibre-reactive group, or those wherein D represents the radical of any diazo component which contains at least one cationic group, or those wherein D represents a diazo component which does not contain water-solubilising groups and optionally contains a fibre-reactive group. Also of interest are 1:1 or 1:2 metal complexes, wherein the metal atom of a metallised group in the radical D is attached in the ortho-position to the azo bridge to the —$NHR_1$ group of the naphthalene nucleus.

Particularly valuable azo dyes are, finally, those of the formula Ia

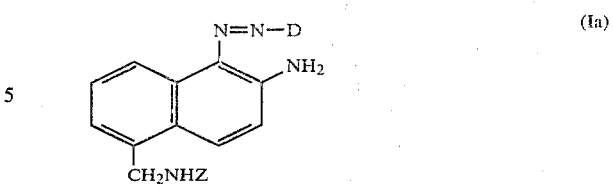

wherein D represents the radical of any diazo component and Z represents a fibre-reactive radical, or those of the formula Ia, wherein D represents the radical of a diazo component which contains at least one water-solubilising group and a fibre-reactive group, and Z represents the radical of a fibre-reactive group, in which case bisreactive dyes are obtained.

The novel azo dyes of the formula I have very good affinity for the substrate and the dyeings obtained with them, especially on wool, synthetic polyamide, such as nylon 66 and polyacrylonitrile, have good fastness properties, in particular good wet- and lightfastness.

The invention also relates to novel coupling components which in the form of the free acid have the formula IIIa

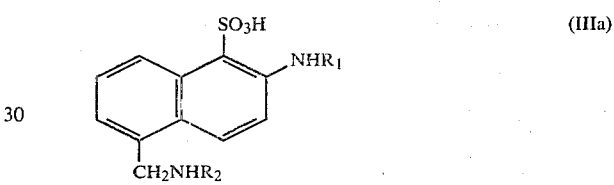

wherein $R_1$ and $R_2$ have the given meanings and each preferably represents hydrogen, with the proviso that both $R_1$ and $R_2$ simultaneously do not represent hydrogen.

The novel azo dyes of the formula I are used for dyeing and printing a very wide variety of natural and synthetic textile materials, such as fibres, filaments and woven fabrics, or leather. Acid dyes which optionally contain fibre-reactive groups are used for dyeing and printing especially cellulosic materials and natural or synthetic polyamide materials. Cationic dyes are used especially for dyeing and printing polyacrylonitrile materials. Disperse dyes are used especially for dyeing and printing polyester materials.

The following Examples illustrate the invention, but imply no restriction to what is described therein. Unless otherwise indicated, the parts by weight. By Tobias acid is meant 2-amino-naphthalene-1-sulphonic acid.

EXAMPLE 1

(a) Diazotisation 14.46 g (0.03 mole) of the diazo component, 5-(1,2-dibromopropionylamino)-aniline-2,4-disulphonic acid, are dissolved in 120 ml of water of 5° to 10° C. with the addition of sodium hydroxide at a pH value of 6.5 to 7.5. Then 7.5 ml (0.03 mole) of 4 N sodium nitrite are added and the solution is added dropwise to a mixture of 210 g of ice and 7.5 ml of conc. hydrochloric acid. The resulting semifluid mass of −2° C. is subsequently stirred for 20 minutes.

(b) Coupling 7.56 g (0.03 mole) of the coupling component, 5-aminomethyl Tobias acid, are stirred separately in 100 ml of water of room temperatur at a pH of 7.6 to a homogeneous suspension, which is then poured into the suspension of the diazonium salt. After reaching room temperature, the coupling mixture is almost completely dissolved at pH 1.6. The coupling is brought to completion by subsequent stirring for 22 hours. The suspension is adjusted from pH 1.5 to 7 by the dropwise addition of conc. sodium hydroxide solution. The volume of the suspension is 550 ml. After addition of 82 g of sodium chloride, the batch is stirred for 10 minutes and then filtered. The dye is washed with 300 ml of sodium chloride solution and dried at 50° to 60° C. in vacuo.

Yield: 18.26 g of the dye of the formula

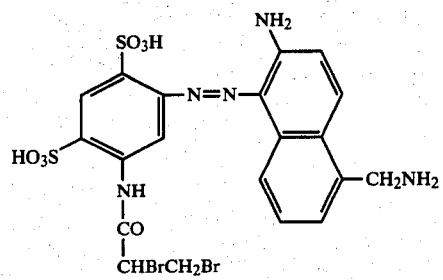

(c) Acylation 6.65 g (0.01 mole) of the dye obtained in (b) are dissolved in 45 ml of N-methylpyrrolidone and the solution is cooled to 2° C. 2.78 ml (0.02 mole) of anhydrous triethylamine are added and then 2.54 ml (0.027 mole) of acetic anhydride as acylating agent and 4 ml (0.029 mole) of anhydrous triethylamine are added dropwise in the course of 15 minutes. The temperature is kept at 2° to 6° C. with ice cooling. After stirring for 5 minutes, the salt residue is removed by filtration. The clear filtrate is poured into 230 ml of chloroform and the suspension is stirred for about 1 hour, then filtered. The dye is washed with 150 ml of chloroform and dried in vacuo at 50° to 60° C., affording 6.93 g of the dye of the formula

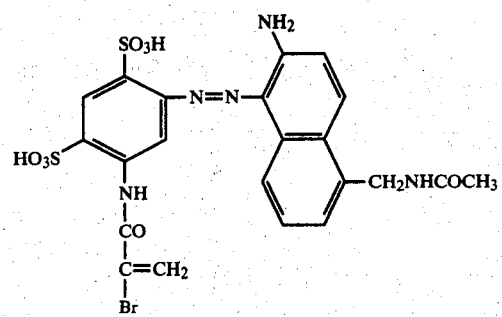

Bright red shades of very good wet- and light-fastness properties are obtained on natural or synthetic polyamide by dyeing in the conventional manner with the non-acylated and acylated dye.

Repetition of the above procedure using the diazo and coupling components listed in columns II and III of Table 1 instead of those used in this Example as well as the acylating agent of column IV instead of the above acylating agent, yields monoazo dyes which dye wool or cotton in the shades indicated in column V.

Table I

| I Example | II Diazocomponent | III Coupling component | IV Acylating agent | V Shade on cotton or wool |
|---|---|---|---|---|
| 2 | ![SO3H, NH2, HO3S, NHCOC=CH2, Br] | ![NH2, HO3S, CH2NH2] | Cl—C(=O)—CH(Br)—CH2Br | red |
| 3 | ![SO3H, NH2, NHCOC=CH2, Br] | " | — | orange |
| 4 | ![OCH3, NH2, O2N, SO3H] | " | Cl—C(=O)—CH(Br)—CH2Br | red |

Table I-continued

| I Example | II Diazocomponent | III Coupling component | IV Acylating agent | V Shade on cotton or wool |
|---|---|---|---|---|
| 5 | 2-amino-5-(α-bromoacryloylamino)benzenesulfonic acid (NH₂, SO₃H, NHCOC(Br)=CH₂) | " | (CH₃CO)₂O (acetic anhydride) | scarlet |
| 6 | 4-amino-2-[(4,6-dichloro-s-triazin-2-yl)-amino-aryl]-5-sulfo benzenesulfonic acid derivative | " | " | scarlet |
| 7 | 4-amino-2-(α-bromoacryloylamino)-5-sulfobenzenesulfonic acid | 5-aminomethyl-1-naphthylamine-? sulfonic acid (H₂N, HO₃S, CH₂NH₂) | 5-chloro-2,4,6-trifluoropyrimidine | scarlet |
| 8 | " | " | 2-methoxy-4,6-difluoro-s-triazine | scarlet |

EXAMPLE 9

(a) Diazotisation 7.7 g (0.05 mole) of the diazo component, 5-nitro-2-aminophenol, are dissolved at room temperature in 250 ml of water with the addition of 25 ml of 2 N sodium hydroxide solution. Diazotisation is effected with 12.5 ml (0.05 mole) of 4 N sodium nitrite and the solution is then treated with an aqueous solution of approx. 30% naphthalene-1-sulphonic acid. After 15 minutes a small excess of nitrite is destroyed with sulphamic acid and the solution is adjusted to a pH value of 3.5 with 59 ml of 1 molar sodium carbonate.

(b) Coupling 12.6 g (0.05 mole) of the coupling component, 5-aminomethyl Tobias acid, are stirred in 100 ml of water at room temperature at pH 7.6 to give a homogeneous suspension, which is then poured into the solution of the diazonium salt. After 1½ hours the pH value is adjusted from 3.9 to 2.3 by the addition of 15 ml of 10 N sulphuric acid. The suspension is heated to 53°–55° C. and stirred for 42 hours until the coupling is complete. The precipitated product is filtered with suction and washed hot with 500 ml of water. The filter cake is stirred in 250 ml of water, and the suspension is heated to 60° C. and adjusted to pH 11 with conc. sodium hydroxide solution. After filtration, the product is washed warm with 500 ml of water until the washings run colourless, then dried in vacuo at 50°–60° C.

Yield: 13.1 g of the dye of the formula

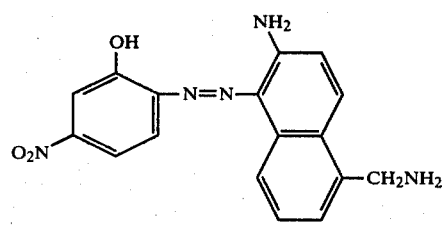

This dye can be converted in known manner into a metal complex. For example it can be converted together with a 1:1 chromium complex dye into an asymmetrical 1:2 metal complex dye in the following manner:

(c) Preparation of the asymmetrical 1:2 chromium complex dye column II and reacting these latter with the 1:1 chromium complex dyes of column III.

Table II

| I Example | II Metal-face Monoazo dye | III 1:1 chromium complex | IV Shade on polyamide |
|---|---|---|---|
| 10 | | | brown |
| 11 | | | brownish-black |

5.16 g (0.01 mole) of the 1:1 chromium complex dye, 4-nitro-2-aminophenol-6-sulphonic acid, coupled to β-naphthol, are stirred in 100 ml of water of room temperature. After addition of 0.98 ml (0.01 mole) of diethanolamine, the pH rises from 5.4 to 8.5. Then 3.37 g (0.01 mole) of the metal-free dye obtained in (b) from 5-nitro-2-aminophenol and 5-aminomethyl Tobias acid are added and the mixture is diluted with 50 ml of n-propanol. The suspension is heated to 75° C. and the pH is again adjusted from 6.7 to 8 with 4 ml of 2 N sodium hydroxide solution. The reaction is complete after 3 hours at 75° C. The reaction mixture is diluted with 150 ml of n-propanol and allowed to cool to 32° C. The dye is collected by filtration, washed with 150 ml of n-propanol and dried in vacuo at 50°–60° C.

Yield: 5.96 g of the dye of the formula

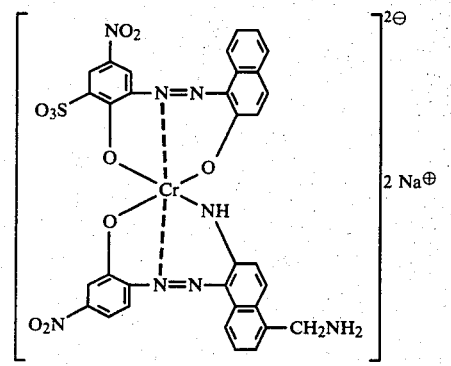

which dyes natural or synthetic polyamide materials in grey to black shades.

Asymmetrical 1:2 chromium complex dyes which dye natural and synthetic polyamide materials in the shades indicated in column IV of Table II are obtained by using instead of the metal-free monoazo dye of (b) the analogously obtained metal-free monoazo dyes of Acylation of the free amino group of the above dyes with α,β-dibromopropionyl chloride yields fibre-reactive dyes which produce a very lightfast dyeing on natural or synthetic polyamide.

EXAMPLE 12

4.17 g (0.01 mole) of the dye obtained by diazotisation of 6-nitro-2-aminophenol-4-sulphonic acid and coupling to 5-aminomethyl Tobias acid are dissolved in 100 ml of water at 80° C. with the addition of 15 ml of 2 N sodium hydroxide solution. To this solution was added 5.5 ml of a 1 molar cobalt sulphate solution. After stirring for ½ hour at 78°–82° C., the solution is filtered. The dye is precipitated from the neutral solution by addition of sodium chloride, collected by filtration and washed with sodium chloride solution.

The resulting paste of the metal complex dye is stirred in 150 ml of water and the mixture is cooled to 10° C. Then 3.8 g of α,β-dibromopropionyl chloride are added dropwise while keeping the pH constant at 9 by the addition of 2 N sodium hydroxide solution. The acylated dye is precipitated by addition of sodium chloride, collected by filtration, washed with sodium chloride solution and dried at 50° to 60° C.

Yield: 8.22 g of the dye of the formula

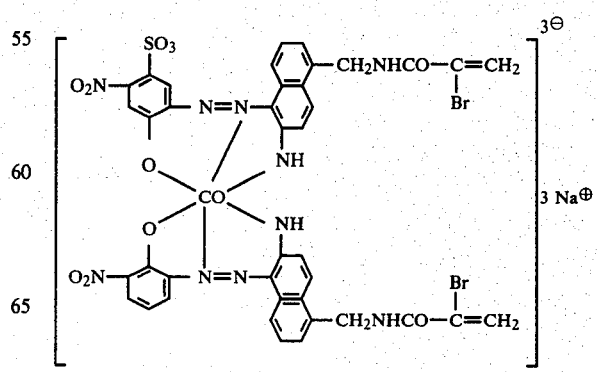

which dyes natural or synthetic polyamide materials in olive green shades.

EXAMPLE 13

(a) Diazotisation 5.41 g (0.02 mole) of the diazo component of the chloride of 1-acetylamino-4-ω-trimethylamino-acetyl-benzene are boiled for 1 hour in a mixture of 10 ml of water and 10 ml of conc. hydrochloric acid. The solution is diluted with 80 ml of water and cooled to 2° C. Diazotisation is effected at 2° to 4° C. with 5 ml (0.02 mole) of 4 N sodium nitrite.

(b) Coupling 5.04 g (0.02 mole) of the coupling component, 5-aminomethyl Tobias acid, are stirred in 50 ml of water of room temperature at pH 7.6 to a homogeneous suspension, which is then poured into the solution of the diazonium salt. The coupling is complete after 18 hours at room temperature. The dye is dissolved by heating to 65° C. and after cooling again to 5° C. and stirring for 1 hour, the product is collected by filtration, washed with 200 ml of 5% saline solution and dried in vacuo at 50° to 60° C.

Yield: 8.97 g of the red dye of the formula

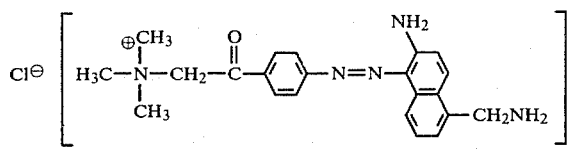

which, after acylation of the —CH$_2$NH$_2$ group with acetic anhydride, gives a dye which dyes polyacrylonitrile materials red with good fastness properties.

An orange cationic dye which dyes polyacrylonitrile materials in orange shades is obtained by repeating the above procedure, but using equimolar amounts of the diazo component of the formula

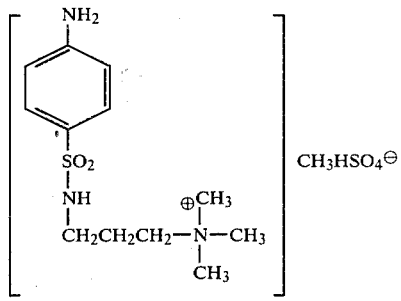

instead of the diazo component in (a), and equimolar amounts of α,β-dibromopropionyl chloride instead of acetic anhydride as acylating agent.

EXAMPLE 14

(a) Diazotisation 1.68 g (0.01 mole) of the diazo component, p-nitro-o-anisidine, are stirred in 25 ml of water and 3 ml of conc. hydrochloric acid until homogeneity is attained. After cooling to 2° C., diazotisation is effected with 10 ml (0.01 mole) of 1 N sodium nitrite at 2° to 4° C. After stirring for 10 minutes, excess nitrite is destroyed with sulphamic acid.

(b) Coupling 2.52 g (0.01 mole) of the coupling component, 5-aminomethyl Tobias acid, are stirred in 60 ml of water at room temperature and pH 7.2 to a homogeneous suspension, which is then poured into the solution of the diazonium salt. The pH is adjusted to 3 with dilute sodium hydroxide solution and the mixture is coupled at 48° to 52° C. in the course of 2 hours. The suspension is adjusted to pH 11 with conc. sodium hydroxide solution and then filtered. The filter cake is washed with 200 ml of water and dried in vacuo at 50° to 60° C., affording 3.04 g of the red dye of the formula

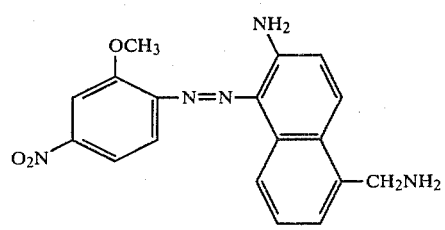

The dye can be used as obtained or in acylated form, for example after reaction with acetic anhydride, for dyeing polyacrylonitrile or polyester materials.

EXAMPLE 15

10 g of wool slubbing are dyed at a temperature of 98° C. for 30 to 90 minutes in an aqueous liquor containing, based on the weight of the fabric, 4% by weight of ammonium sulphate, 1.5% by weight of 80% acetic acid, 1% by weight of Albegal B and 2% by weight of the dye of Example 1 (c). The dyebath is then cooled to 80° C., neutralised by adding 2.5% by weight of 25% aqueous ammonia, and the goods are subjected to an aftertreatment for 15 minutes at this temperature. The dyed wool is then removed from the bath and washed and dried in the conventional manner. The wool is dyed in a red shade of good light- and wetfastness properties.

What is claimed is:

1. An azo dye of the formula

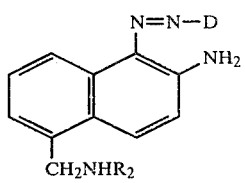

wherein D is the radical of a diazo component; and R$_2$ is hydrogen, —COR or —SO$_2$R where R is methyl, ethyl, n-propyl, isopropyl, butyl, benzyl or phenyl which is unsubstituted or substituted by alkyl, alkoxy or halo; and R$_2$ is a fiber-reactive radical capable of reacting with the hydroxy groups of cellulosic materials or with the NH groups of natural polyamide fibers to form a covalent bond therewith.

2. An azo dye according to claim 1, wherein D is substituted by sulfo, carboxy or phosphono.

3. An azo dye according to claim 2, wherein D is substituted by a fiber-reactive group capable of reacting with the hydroxy groups of cellulosic materials or with the NH groups of natural polyamide fibers to form a covalent bond therewith.

4. An azo dye according to claim 1, wherein D contains at least one cationic group.

5. A 1:1 or 1:2 copper, chromium, nickel or cobalt metal complex of an azo dye according to claim 1, wherein D is bonded to said metal through a metallisable group in the ortho-position to the azo bridge.

6. An azo dye according to claim 1, wherein D is free from water-solubilising groups.

7. An azo dye according to claim 6, wherein D is substituted by a fiber-reactive group capable of reacting with the hydroxy groups of cellulosic materials or with the NH groups of natural polyamide fibers to form a covalent bond therewith.

* * * * *